Figure 1:
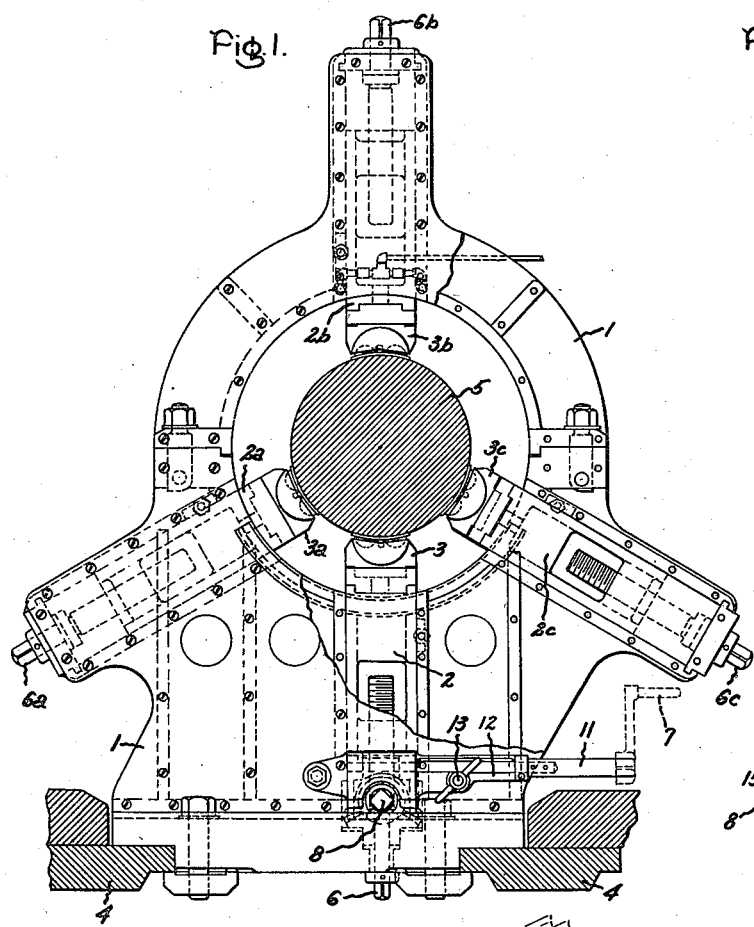

April 8, 1952 A. ALEXAY 2,592,229
SELF-ALIGNING SHOE FOR STEADY RESTS USED ON LATHES
Filed March 13, 1951 2 SHEETS—SHEET 1

Inventor:
Adalbert Alexay,
by Ernest H. Britton
His Attorney.

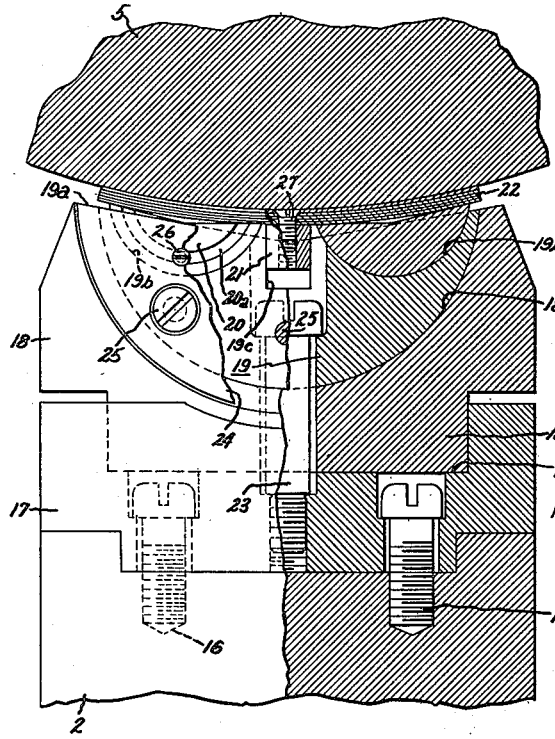
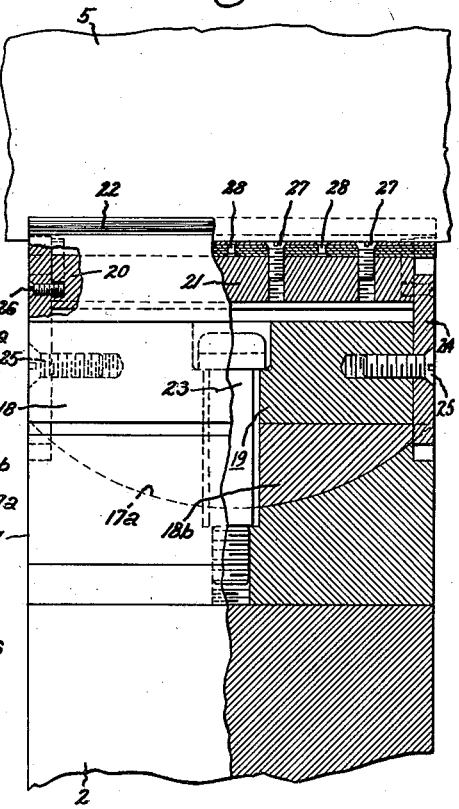
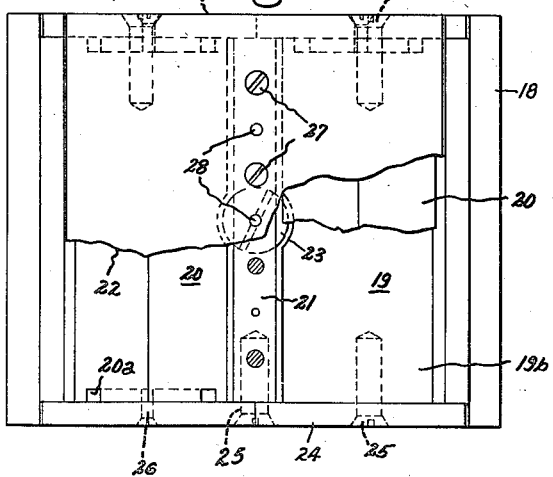
Inventor:
Adalbert Alexay.
by Ernest C. Britton
His Attorney.

Patented Apr. 8, 1952

2,592,229

UNITED STATES PATENT OFFICE 2,592,229

SELF-ALIGNING SHOE FOR STEADY RESTS USED ON LATHES

Adalbert Alexay, Schenectady, N. Y., assignor to General Electric Company, a corporation of New York Application March 13, 1951, Serial No. 215,320

3 Claims. (Cl. 308—73)

My invention relates to steadyrests for steadying and supporting rotating stock between end spindles on lathes and, more particularly, to shoes for such steadyrests.

When heavy or flexible stock is being machined in a lathe, it is often steadied and supported at intermediate points between end spindles by steadyrests having a plurality of circumferentially spaced shoes slidably engaging a cylindrical portion of the stock. This, in a large measure, prevents unduly high loads upon the end spindles of the lathe and prevents flexing of the stock due to a tool force thereupon. Usually the shoes are firmly mounted upon the inner extremities of radially adjustable jaws so that they can be positioned to engage shafts of different diameters.

The term "shaft," as used in the preceding paragraph and in the remainder of this specification, means a cylindrical portion of a piece of stock being machined and is so defined because all stock, rough or finished, is not cylindrical throughout its entire length.

The conventional one-piece metal shoes used heretofore have a wide V-shaped surface which will engage shafts of various diameters at two points within the V. Thus the shaft and shoe have two-line contact only, and, unless the axial length of the shoe is great, the bearing pressures along the lines of contact may be such that damaging wear either to the shoe or the shaft may result.

Further, it is difficult to set up a steadyrest employing conventional V-shaped shoes so that the shoe surface is aligned with the shaft surface in an axial direction and in a radial direction, i. e., so that the bisector of the angle formed by the V-shaped surface passes through the center of the shaft. Unless such alignment is very nearly obtained and maintained by frequent adjustments, the bearing pressures may become quite excessive due to the lines of contact being shortened or to the load being unequally distributed between the lines of contact.

It is, therefore, an object of my invention to provide a new and improved shoe for steadyrests used on lathes.

It is another object of my invention to provide a shoe for steadyrests used on lathes having greater bearing area between the shaft and shoe, and thus, affording less bearing pressure and resultant wear.

It is still another object of my invention to provide a shoe for steadyrests used on lathes which is self-aligning along the axial and radial dimensions of the shaft and which is, therefore, more convenient and reliable in use.

In carrying out my invention, I provide a first base member adapted on one side to be mounted in any conventional way upon the jaw of a steadyrest and having the surface of its opposite side shaped to form a cylindrical segmental depression. A second base member is provided having on one side a cylindrical segmental projection to fit within the depression of the first base member and afford limited sliding rotation of the second base member within the first base member. The surface of the opposite side of the second base member is shaped to form a second cylindrical segmental depression with its longitudinal axis at right angles to the aforementioned projection. A cylindrical segmental member is shaped to fit into the second segmental depression and to afford limited rotation therein. A loosely fitting fastener, such as a bolt, may be used to hold the first and second base members and the segmental member together while allowing mutual limited rotation of these members. The chord surface, i. e., the surface opposite the cylindrically curved surface, of the cylindrical segmental member is shaped to form, in effect, a wide V-like surface having two smaller parallel cylindrical segmental depressions, one in each half thereof, separated by a slot at the vertex of the V. Two smaller cylindrical segmental members are placed in rotational engagement in the smaller segmental depressions. The chord surfaces of these are also shaped to form wide V-like surfaces. A bar-like member, equal to or less in height than the depth of said slot, is fitted into the slot and a flexible sheet of bearing material fastened to the bar-like member to cover the smaller segmental members.

When the shoe comprising the members described is placed in engagement with a shaft surface bearing on the flexible sheet, the shaft deforms the flexible sheet to a curved surface of its own diameter by depressing the bar-like member into the slot until the bearing weight is supported by the smaller cylindrical segmental members, which rotate to facilitate the proper shaping of the flexible sheet. By mutual rotation of the first and second base members and the cylindrical segmental member, the flexible sheet is also automatically aligned axially and radially with the shaft surface, such rotation being caused by the pressure of the shaft.

For a better understanding of my invention, together with further objects and advantages thereof, reference should now be had to the following description referring to the accompanying drawing.

Figure 2:
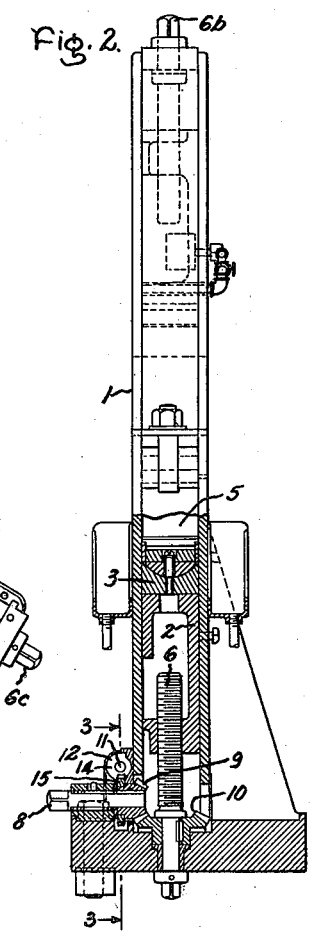
Figure 3:
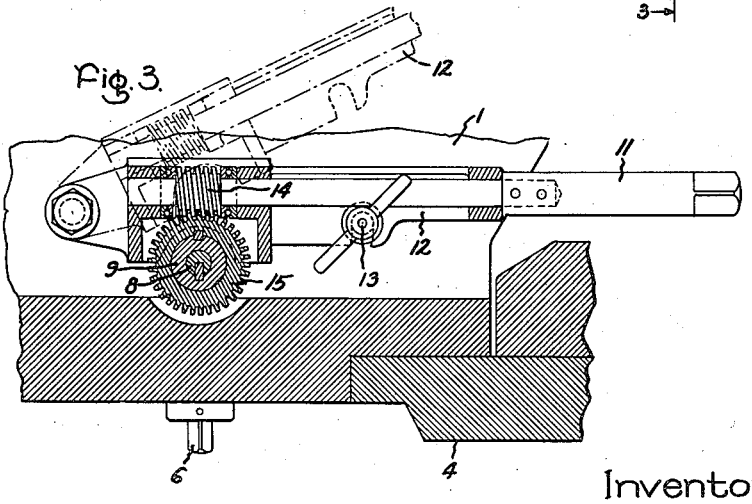

In the drawing, Fig. 1 is a front elevation partly in section of a steadyrest as applied on lathes; Fig. 2 is a side elevation partly in section of the steadyrest shown by Fig. 1; Fig. 3 is a sectional view taken along line 3—3 in Fig. 2 looking in the direction of the arrows; Fig. 4 is a front elevation partly in section of one embodiment of the shoe of my invention together with a portion of a shaft; Fig. 5 is a side elevation partly in section of the shoe and a portion of the shaft shown by Fig. 4; and Fig. 6 is a partially cutaway plan view of the shoe illustrated by Fig. 4.

In Fig. 1, a steadyrest is shown comprising a frame 1, radially adjustable jaws 2, 2a, 2b, and 2c and shoes 3, 3a, 3b, and 3c. The steadyrest is illustrated in typical use on a lathe, mounted upon a lathe bed 4 and supporting a work piece of stock illustrated as a shaft 5. The jaws 2, 2a, 2b, and 2c are in sliding engagement with frame 1 and in threaded engagement with rotatable screw members 6, 6a, 6b, and 6c respectively which afford radial adjustment of the positions of the jaws. The axis of frame 1 is defined as the same as the axis of shaft 5.

The lower vertical jaw 2 and its co-engaging screw member 6 are provided with a multiple reduction gear mechanism, best illustrated by Figs. 2 and 3, to afford ease in raising heavy shafts of different weights into the proper position. A crank member, such as a removable crank 7, may be used to turn screw member 6 directly, or to turn a journaled shaft member 8 to which is fixed a first gear 9 cooperating with a second gear 10 which is fastened to screw member 6. A third method, providing still greater mechanical advantage, is provided by a second shaft member 11 journaled in a pivoted member 12. Member 12 may be swung down into position and locked in place by a clamp 13 so that a worm gear 14 fastened to shaft member 11 engages a third gear 15 fastened to member 8. Shaft member 11 may then be rotated by crank 7, causing shaft member 8 to rotate, thus causing screw member 6 to rotate, and thereby causing jaw 2 to be raised or lowered.

The preferred embodiment of the shoe of my invention is more clearly illustrated by Figs. 4, 5, and 6. A shoe, such for example as the shoe 3, is shown fastened to the jaw 2 by suitable means, such as countersunk bolts 16. A first base member 17, having its upper surface formed to include a cylindrical segmental depression 17a is that part of the shoe which is actually fastened to jaw 2. A second base member 18, having its upper surface formed to define a cylindrical segmental depression 18a, rests with a cylindrical segmental projection 18b disposed in depression 17a. The longitudinal axes, i. e., axes parallel to elements of cylindrical surfaces, of depression 18a and projection 18b are mutually at right angles, one being parallel and the other perpendicular to the axis of the shaft 5.

A cylindrical segmental member 19 is positioned to rest with its major curved surface engaging the surface of depression 18a. The chord surface 19a, i. e., the surface opposite the cylindrically curved surface, of member 19 is essentially of a wide V-shape, i. e., it may be thought of as formed of two surfaces intersecting to form an obtuse plane angle such that its cross section is a relatively flat V. Chord surface 19a is further formed in the shape of two smaller cylindrical segmental depressions 19b separated by a slot 19c. Two smaller cylindrical segmental members 20 are positioned in depressions 19b for limited rotation therein. The chord surfaces of members 20 are of a wide V-shape. A bar-like member 21, with a flexible sheet of bearing material 22 suitably fastened thereto, is positioned in slot 19c so that flexible sheet 22 covers the small segmental members 20. The shaft 5 is in rotational sliding engagement with flexible sheet 22. It is to be noted that the height of bar-like member 21 is equal to or less than the depth of slot 19c.

A fastener, such as countersunk bolt 23, may be provided as shown, in threaded engagement with base member 17 and extending through oversized holes in base member 18 and segmental member 19 to limit the mutual rotation of these members and to hold them in place. End plates 24, of greater radius than segmental member 19, may be provided as shown in the drawing, fastened by fasteners 25 to segmental member 19 to prevent axial movement of member 19 within depression 18a and to hold other fasteners 26. Fasteners 26 slidably engage members 20 in circular arc grooves 20a, holding members 20 in place but permitting rotation thereof within depressions 19b. Flexible sheet 22 may be fastened to bar-like member 21 by countersunk bolts 27, as shown. A preferred form of sheet 22 is a lamination, held together by rivets 28, of several layers of suitable flexible material, the uppermost of which is a suitable bearing metal, such as beryllium bronze. The lower sheets may be of flexible metal or in some cases made of suitable plastics.

In the use of the steadyrest shoe, the jaw 2 is positioned radially so that flexible sheet 22 engages the surface of shaft 5, the pressure of the shaft causing bar-like member 21 to be partially depressed into slot 19c and segmental members 20 to rotate to positions in which the curvature of flexible sheet 22 becomes substantially the same as that of the surface of shaft 5. It will be seen that this self-adjustment of the curvature of flexible sheet 22 allows the shoe to accommodate a large range of different diameter shafts. The bearing area of shaft 5 and metal sheet 22 is considerably greater than that between a conventional one piece V-shaped shoe and a shaft.

Further, the forces of shaft 5 upon the shoe cause segmental member 19 to rotate within depression 18a until flexible sheet 22 is radially adjusted and the shaft force is equally distributed between each of the segmental members 20. Also, these transmitted forces cause second base member 18 to rotate within depression 17a until the metal sheet 22 is aligned axially with the surface of shaft 5. Thus, the self-alignment features of this unique shoe not only provide a greater bearing area between shoe and different size shafts but also provide means whereby the load is automatically uniformly distributed over that area.

Another advantage of the present invention is that the flexible sheet 22, or merely the top sheet if member 22 is laminated, may easily be replaced after considerable use and wear. This may be economically and easily done without providing a whole new shoe, as is necessary with the conventional one-piece V-shaped shoes.

It will be apparent that the end plates 24 may be replaced by other axial movement preventing means and that the functions of the various fasteners may be achieved by means other than those shown and described. While the present invention has been described by reference to a particular embodiment thereof, it will be understood that numerous modifications may be made by those skilled in the art without actually departing from the invention. I, therefore, aim in the appended claims to cover all such equivalent variations as come within the true spirit and scope of the invention.

What I claim as new and desire to secure by Letters Patent of the United States is:

1. A self-aligning shoe for steadyrests used on lathes and the like comprising a first base member having one surface thereof formed to define a first cylindrical segmental depression, a second base member having a cylindrical segmental projection on a first surface thereof and positioned for limited rotation within said first depression and having the surface thereof opposite said first surface formed to define a second cylindrical segmental depression, the longitudinal axes of said projection and said second depression being mutually at right angles, a first cylindrical segmental member positioned for limited rotation within said second depression and having the chord surface thereof formed to a V-shape, said chord surface being further formed to define a plurality of parallel cylindrical segmental depressions and a slot separating two of said parallel depressions, a plurality of parallel cylindrical segmental members each mounted for limited rotation in a different one of said parallel depressions and having the chord surfaces thereof formed to a V-shape, a bar-like member positioned in said slot, and a flexible sheet of bearing material fastened to said bar-like member to cover said chord surfaces of said parallel cylindrical segmental members.

2. A self-aligning steadyrest shoe for the intermediate support of a rotating shaft in a lathe and the like comprising a first base member having one surface thereof formed to define a first cylindrical segmental depression with its longitudinal axis perpendicular to the axis of the shaft, a second base member having a cylindrical segmental projection on a first surface thereof positioned for limited rotation within said first depression and having the surface thereof opposite said first surface shaped to define a second cylindrical segmental depression with its longitudinal axis parallel to the axis of the shaft, a first cylindrical segmental member positioned for limited rotation within said second depression and having the chord surface thereof formed to a V-shape, said V-shaped surface being further shaped to define two smaller cylindrical segmental depressions separated by a slot, two cylindrical segmental members positioned for limited rotation one in each of said two depressions and having the chord surfaces thereof formed to U-shapes, a bar-like member of height equal to or less than the depth said slot positioned in said slot, and a flexible sheet of bearing material fastened to said bar-like member to cover said chord surfaces of said two cylindrical segmental members.

3. A self-aligning steadyrest shoe for the intermediate support of a rotating shaft in a lathe and the like, comprising a first base member adapted for attachment to the jaw of a steadyrest and having one surface thereof formed to define a first cylindrical segmental depression with its longitudinal axis oriented perpendicular to the axis of the shaft, a second base member having a cylindrical segmental projection from a first surface thereof positioned for limited rotation within said first depression and having the surface thereof opposite said first surface formed to define a second cylindrical segmental depression open at its ends, the longitudinal axes of said projection and said second depression being mutually at right angles, a first cylindrical segmental member positioned for limited rotation within said second depression and having the chord surface thereof formed to a V-shape, said V-shaped chord surface being further formed to define two smaller cylindrical segmental depressions and a slot separating said smaller depressions, said smaller depressions being located one in each face of the said V-shaped surface and said slot being located at the vertex of said V-shaped surface, two smaller cylindrical segmental members positioned for limited rotation one in each of said smaller depressions and having the chord surfaces thereof formed to a V-shape, the end surfaces of said smaller segmental members containing circular arc grooves, end plates of radius greater than the radius of said first segmental member fastened to the end surfaces of said first segmental member to prevent axial movement of said first segmental member in said second depression, fasteners mounted in said end plates and slidably engaging said smaller cylindrical segmental members in said grooves, a bar-like member of height equal to or less than the depth of said slot positioned partially within said slot, a lamination of flexible sheets fastened to said bar-like member and covering said smaller cylindrical segmental members, the top sheet of said lamination being of a bearing metal, and a fastener engaging said first base member and said second base member and said first cylindrical segmental member to hold these members together while affording limited mutual rotation thereof.

ADALBERT ALEXAY.

REFERENCES CITED

The following references are of record in the file of this patent:

UNITED STATES PATENTS

| Number | Name | Date |
|---|---|---|
| 258,000 | Balsbaugh | May 16, 1882 |
| 1,059,545 | Kunze | Apr. 22, 1913 |
| 1,405,325 | Posch | Jan. 31, 1922 |
| 1,453,045 | Forster | Apr. 24, 1923 |